June 1, 1971

S. A. JONES

3,582,363

CONTAINER WITH POPCORN AND PROCESS OF PACKAGING AND POPPING

Filed Aug. 20, 1968

Inventor:
Sam A. Jones,
by Harold E. Cole
Attorney 3,582,363
CONTAINER WITH POPCORN AND PROCESS OF
PACKAGING AND POPPING
Sam A. Jones, Essex Hotel, 695 Atlantic Ave.,
Boston, Mass. 02111
Filed Aug. 20, 1968, Ser. No. 753,959
Int. Cl. B65d 81/34
U.S. Cl. 99—171                 1 Claim

ABSTRACT OF THE DISCLOSURE

A process for packaging and popping natural popcorn is disclosed which comprises packaging of kernels in their natural condition under a vacuum and then applying heat internally to the said kernels until they are popped and substantially fill the container.

---

The principal object of my invention is to provide conditions in a container holding popcorn kernels or similar articles whereby said kernels can be successfully popped in a reduced pressure by applying internal heat thereto, thus expanding them unusually and producing a food product that is unusually tender and tasty and of increased volume, which gives the customer a larger than usual bagful thereof at the usual consumer cost.

Another object is to provide a simpler process for packaging and popping said kernels or the like whereby a storekeeper or other business man catering to the consumer will only require heating equipment, being able to purchase and carry in stock bags containing said kernels that are vacuum sealed, and ready for heating and popping inside the container whenever desired.

The foregoing and other objects which will appear as the nature of the invention is better understood, may be accomplished by a combination and arrangement, and process, such as is disclosed by the drawing and specification. The nature of the invention is such as to render it susceptible to various changes and modifications, and therefore, I am not to be limited to what is disclosed by the drawing, nor to the particular parts and process steps described in the specification; but am entitled to all such changes therefrom as fall within the scope of my claim.

Figure 1:
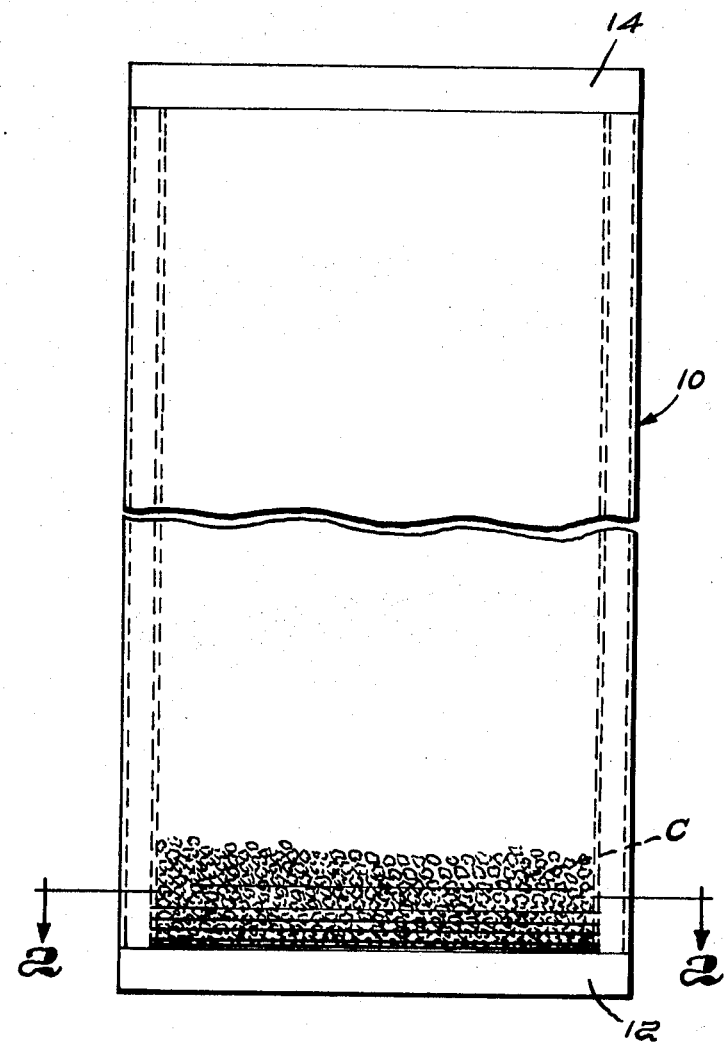
FIG. 1 is a plan view of a sealed container with popcorn kernels occupying part of the interior.
Figure 2:
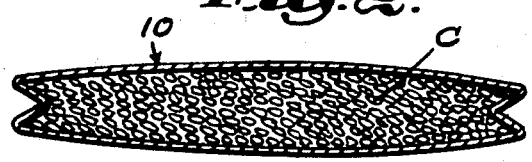
FIG. 2 is a sectional view taken on the line 2—2 of FIG. 1.

As illustrated, a bag or container 10, which may be made of airtight, flexible material such as cellophane, contains kernels C at one end portion in natural, that is, unpopped condition, which only partly occupy the interior of the container. The latter is sealed at both ends as at 12 and 14, as well as at the sides.

After a predetermined quantity of said kernels are placed in said container, preferably enough to fill the latter when popped, the container is vacuum-sealed by evacuating, as by flattening it, substantially all of the air therefrom, which reduces the internal pressure therein. The package is ready for popping then, or some time later, as upon delivery to a storekeeper.

The popping is effected by applying the necessary heat internally to the kernels, inside the sealed container, by well-known micro-wave or dielectric heating at a temperature of 450–500 degrees F., for instance. The volume of the kernels is thereby increased, and preferably the bag will then be filled with popped kernels that are unusually large, tender and tasty, because of having been popped as above described. Reduced pressure will be maintained during the popping since the increased volume occupied by the popping kernels as compared to the volume the unpopped kernels did occupy in the sealed container assures such reduced pressure.

What I claim is:

1. A process of packaging and popping natural popcorn comprising only partly filling a container of flexible material with shelled popcorn kernels in natural condition that are adapted to swell when heat is applied to them, then evacuating substantially all of the air from said container until a substantial vacuum therein is effected, and sealing said container to preserve said vacuum, and then applying heat internally to said kernels until they are popped and substantially fill the container.

References Cited

UNITED STATES PATENTS

| | | | |
|---|---|---|---|
| 2,480,679 | 8/1949 | Spencer | 99—171H |
| 2,673,805 | 3/1954 | Colman | 99—171H |
| 2,673,806 | 3/1954 | Colman | 99—171H |
| 2,819,976 | 1/1958 | Hines | 99—171H |
| 3,052,554 | 9/1962 | Colman | 99—171H |
| 3,261,140 | 7/1966 | Long et al. | 99—171X |

FRANK W. LUTTER, Primary Examiner

W. L. MENTLIK, Assistant Examiner

U.S. Cl. X.R.

99—81